United States Patent [19]
Matsuoka

[11] Patent Number: 5,942,998
[45] Date of Patent: Aug. 24, 1999

[54] DIGITAL AUDIO DEVICE

[75] Inventor: Hiroyuki Matsuoka, Higashihiroshima, Japan

[73] Assignee: Sharp Kabushiki Kaisha, Osaka, Japan

[21] Appl. No.: 08/844,956

[22] Filed: Apr. 23, 1997

[30]     Foreign Application Priority Data

Aug. 29, 1996 [JP] Japan .................................. 8-228332

[51] Int. Cl.⁶ .................................................. H03M 1/66
[52] U.S. Cl. ........................................................ 341/144
[58] Field of Search ............................ 341/144, 61, 143, 341/110, 155, 122, 123

[56]            References Cited

U.S. PATENT DOCUMENTS

| | | |
|---|---|---|
| 4,734,797 | 3/1988 | Takahashi et al. . |
| 5,387,910 | 2/1995 | Medan et al. ............................. 341/61 |
| 5,506,932 | 4/1996 | Holmes et al. . |
| 5,748,126 | 5/1998 | Ma et al. ............................... 341/143 |

FOREIGN PATENT DOCUMENTS

| | | |
|---|---|---|
| 03 88215 A2 | 9/1990 | European Pat. Off. . |
| 06 35826 A2 | 1/1995 | European Pat. Off. . |
| 05002859 | 1/1993 | Japan . |
| 06180948 | 6/1994 | Japan . |
| 07014371 | 1/1995 | Japan . |
| 07021749 | 1/1995 | Japan . |
| 8-022671 | 1/1996 | Japan . |
| 8-056211 | 2/1996 | Japan . |

Primary Examiner—Brian Young

[57]            ABSTRACT

Clocks of various types of input digital audio signals having different sampling frequencies, for example 48.1 KHz, 44.1 KHz and 32 KHz, are extracted by a PLL circuit. The input digital audio signals are converted into signals of a predetermined sampling frequency, for example 41.1 KHz, on average based on the extracted clocks by a frequency converter circuit, and then converted into signals of a uniform output rate by an FIFO circuit. The signals of a uniform output rate from the FIFO circuit are converted into analog outputs by a D/A converter. In this structure, when reproducing the input digital audio signals as monitor sounds while recording the input digital audio signals, it is possible to achieve an improvement of the monitor sounds.

7 Claims, 4 Drawing Sheets

DIGITAL AUDIO DEVICE

FIELD OF THE INVENTION

The present invention relates to digital audio devices capable of recording and reproducing audio signals with the use of a recording medium such as a mini disk (hereinafter referred to as the "MD"), and more particularly relates to a digital audio device capable of providing improved monitor sounds when recording audio signals.

BACKGROUND OF THE INVENTION

An MD apparatus is one example of conventional digital audio devices capable of recording and reproducing audio signals. In such a digital audio device, when listening to audio signals of, for example, music, by outputting the audio signals as monitor outputs at the same time the audio signals are recorded, the following operation is performed. The input rate of digital audio signals to be input varies. The digital signals input at the varying input rate are first guided to a digital PLL (phase locked loop). In the digital PLL circuit, clocks corresponding to the sampling frequency of the input digital audio signals, for example, 48 KHz, 44.1 KHz or 32 KHz, are extracted. Signals, such as data synchronous with the clocks extracted by the PLL circuit, bit clock, LR signal, and D/A converter-use master clock, are input to a D/A converter in the next stage, for converting these signals into analog signals. Then, the monitor outputs of analog signals are obtained.

However, in the conventional digital audio device, when digital audio signals to be recorded on a recording medium are supplied as digital optical inputs, noise is produced due to external interference or a variation in the input rate of digital audio signals. As a result, a fluctuation occurs in the clocks output by the digital PLL circuit. The fluctuation in the clocks causes noise in the D/A converter for converting a digital signal into an analog signal in the next stage, and disturbs the audio signals of music, etc., resulting in undesired sounds.

SUMMARY OF THE INVENTION

It is an object of the present invention to provide a digital audio device capable of achieving improved reproduced sounds by extracting clocks of input digital audio signals and reproducing the input digital audio signals based on the clocks. More particularly, it is an object of the present invention to provide a digital audio device capable of achieving an improvement of monitor sounds when reproducing input digital audio signals as monitor sounds while recording the input digital audio signals.

In order to achieve the above object, a digital audio device of the present invention capable of reproducing various types of input digital audio signals of different sampling frequencies by converting the input digital audio signals into analog signals, includes:
 a clock extracting section for extracting clocks of the digital audio signals;
 a frequency converting section for converting the input digital audio signals into digital signals of a predetermined sampling frequency on average based on the clocks extracted by the clock extracting section;
 an output rate converting section for converting the digital signals output from the frequency converting section into digital signals of a uniform output rate; and
 a D/A converting section for converting the digital signals output from the output rate converting section into analog signals.

In this digital audio device, for example, when recording various types, such as DAT, CD and BS, of input digital audio signals having different sampling frequencies on a recording medium like a MD, digital audio signals are input to the clock extracting section where clocks which are synchronous with the input digital audio signals are extracted. Subsequently, the input digital audio signals are converted into signals of a predetermined sampling frequency on average, for example, the sampling frequency of the recording medium, based on the clocks extracted by the clock extracting section. The digital audio signals output from the frequency converting section are supplied to the output rate converting section where the digital audio signals are converted into data of a uniform output rate. The data are output from the output rate converting section, and then converted into analog signals and output to a reproducing device like a speaker.

In this structure, even when noise which is produced by external interference is mixed with the digital audio signals supplied as digital optical inputs or even when the input rate of the digital audio signals varies and a fluctuation occurs in the clocks extracted by the clock extracting section, there are no audible disturbances in the reproduced sounds because the digital audio signals are output after being converted into data of a uniform output rate by the output rate converting section. Therefore, like in the reproduction, it is possible to achieve improved monitor sounds when recording input digital audio signals without causing audible disturbances.

For a fuller understanding of the nature and advantages of the invention, reference should be made to the ensuing detailed description taken in conjunction with the accompanying drawings.

DESCRIPTION OF THE PREFERRED EMBODIMENT

One embodiment of the present invention will be described below.

Figure 1:
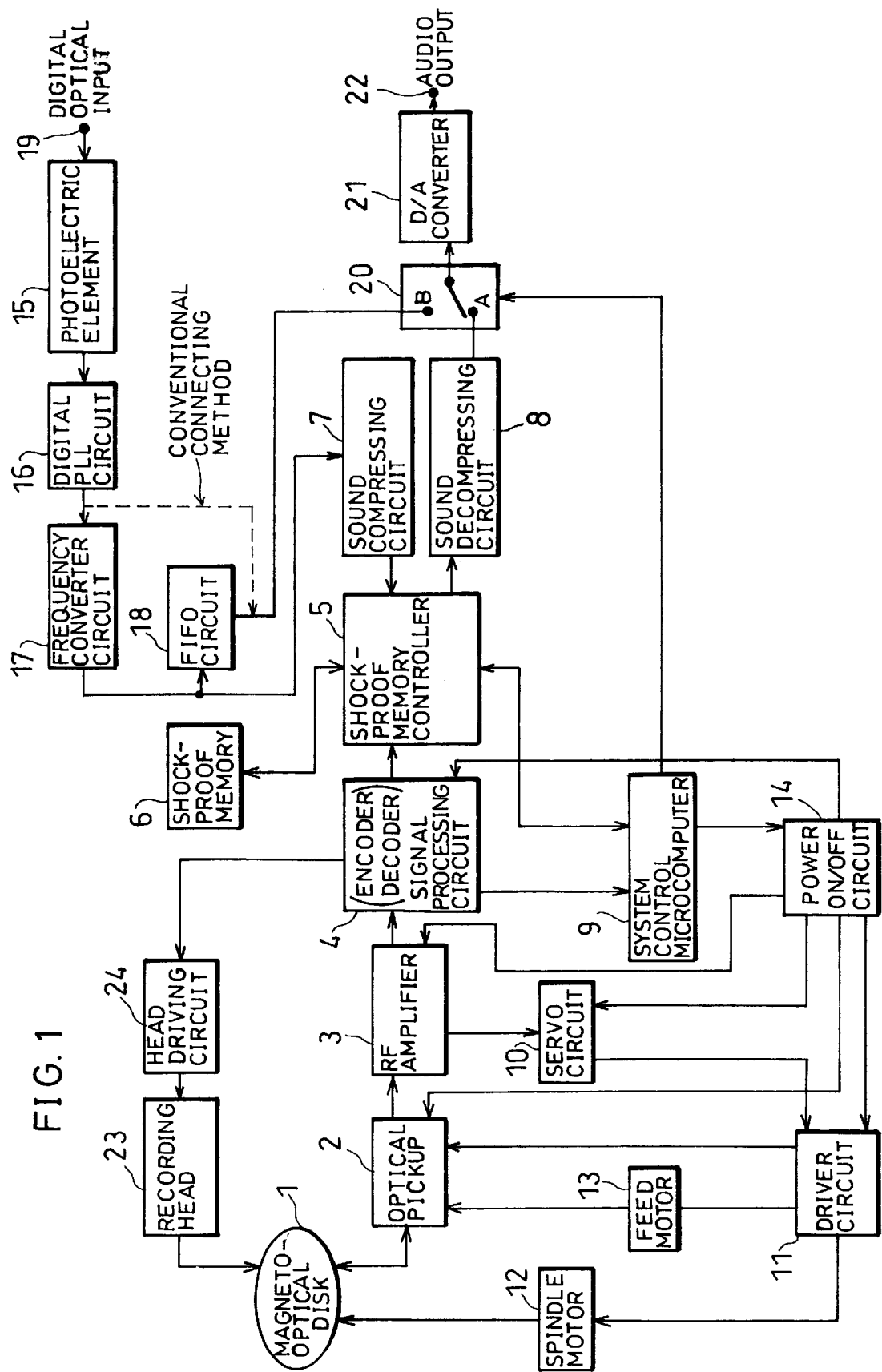
FIG. 1 is a block diagram showing the structure of a digital audio device according to one embodiment of the present invention.

Referring to the drawings, the following description will discuss a mode for implementing the present invention by an MD apparatus. FIG. 1 is a block diagram of the MD apparatus. The recording and reproduction principles of the MD apparatus will be briefly explained with reference to FIG. 1. In recording, for example, an audio signal to be recorded is given as a digital optical input from a terminal 19.

After the digital optical input is converted into a digital electric signal by a photoelectric element 15, the digital electric signal is supplied to a digital PLL circuit 16. In the digital PLL circuit 16, a clock extraction, and a data detection according to the sampling frequency of DAT, CD, BS, etc., for example, 48 KHz, 44.1 KHz or 32 KHz, are performed. The data detected by the digital PLL circuit 16 is guided to a frequency converter circuit 17. In the frequency converter circuit 17, the data is converted into data of a predetermined sampling frequency of 44.1 KHz that is the sampling frequency of the MD.

Subsequently, the data is compressed by ATRAC (adaptive transform acoustic coding) in a sound compressing circuit 7, and then output to a signal processing circuit 4 through a shock-proof memory controller 5 for controlling a shock-proof memory 6. In the signal processing circuit 4, signal processing like the addition of parity by an encoder is performed.

The shock-proof memory 6 is provided to protect the sound data. The shock-proof memory 6 is controlled by the shock-proof memory controller 5 to absorb the difference between the transfer rate of sound data to be output from the sound compressing circuit 7 and the transfer rate of sound data to be input to the signal processing circuit 4, and to interpolate an interruption of signals due to external interference such as vibration in the reproduction.

Next, in a pickup 2, laser light is applied to a recording position on a magneto-optical disk (recording medium) 1 constituting an MD, and at the same time a magnetic head 23 is moved to the recording position by a head driving circuit 24. The data which underwent the signal processing by the encoder in the signal processing circuit 4 is recorded as digital audio data in a predetermined position on the magneto-optical disk 1 by forming a magnetic field corresponding to the data in the recording position with the magnetic head 23.

Then, a feed motor 13 moves the optical pickup 2 in a direction orthogonal to a track on the magneto-optical disk 1. A spindle motor 12 rotates the magneto-optical disk 1. A driver circuit 11 supplies electric power to actuate a driving device for driving the feed motor 13, the spindle motor 12, and the objective lens of the optical pickup 2. A servo circuit 10 feedback-controls the respective devices driven by the driver circuit 11. This structure allows accurate operations, for example, the light from the optical pickup 2 accurately follows the target track on the magneto-optical disk 1.

During reproduction, the optical pickup 2 applies laser light to the magneto-optical disk 1, and reads the light reflected from the magneto-optical disk 1 to detect an RF signal (modulated sound data) recorded on the magneto-optical disk 1. The detected RF signal is amplified by a RF amplifier 3, and then sent to the signal processing circuit 4 in which decoding is performed by a decoder. Thereafter, the resultant signal undergoes processes opposite to those in the recording, such as shock-proof processing by the shock-proof memory 6 and the shock-proof memory controller 5, and decompressing of a reproduced signal by a sound decompressing circuit 8, and is then converted into an analog signal by the D/A converter 21. As a result, the RF signal is output as a reproduced output of the audio signal from an output terminal 22. All of the above-mentioned processes are integrally managed by a system control microcomputer 9. At this time, a switch of a switching circuit 20 is set to the A side by the system control microcomputer 9.

The optical pickup 2, RF amplifier 3, signal processing circuit 4, shock-proof memory controller 5, shock-proof memory 6, sound compressing circuit 7, sound decompressing circuit 8, system control microcomputer 9, servo circuit 10, driver circuit 11, spindle motor 12, feed motor 13, magnetic head 23, and head driving circuit 24 function as a recording and reproducing device.

In this digital audio device, when listening to audio signals to be recorded, for example, music, as monitor sounds while recording the audio signals on the magneto-optical disk 1, the following operations are performed. Specifically, audio signals which have been frequency-converted by the frequency converter circuit 17, i.e., audio signals having the predetermined sampling frequency of 44.1 KHz, are guided to an FIFO (first in first out) circuit 18 as output rate convertor. In the FIFO circuit 18, the audio signals are converted into data of a uniform output rate. Thereafter, the switch of the switching circuit 20 is set to the B side by the system control microcomputer 9 so as to input the audio signals to the D/A converter 21 in which the audio signals are converted into analog signals. As a result, monitor outputs are obtained. In FIG. 1, a broken line which directly connects the output of the digital PLL circuit 16 to the switching circuit 20 indicates a conventional connecting method.

Figure 2:
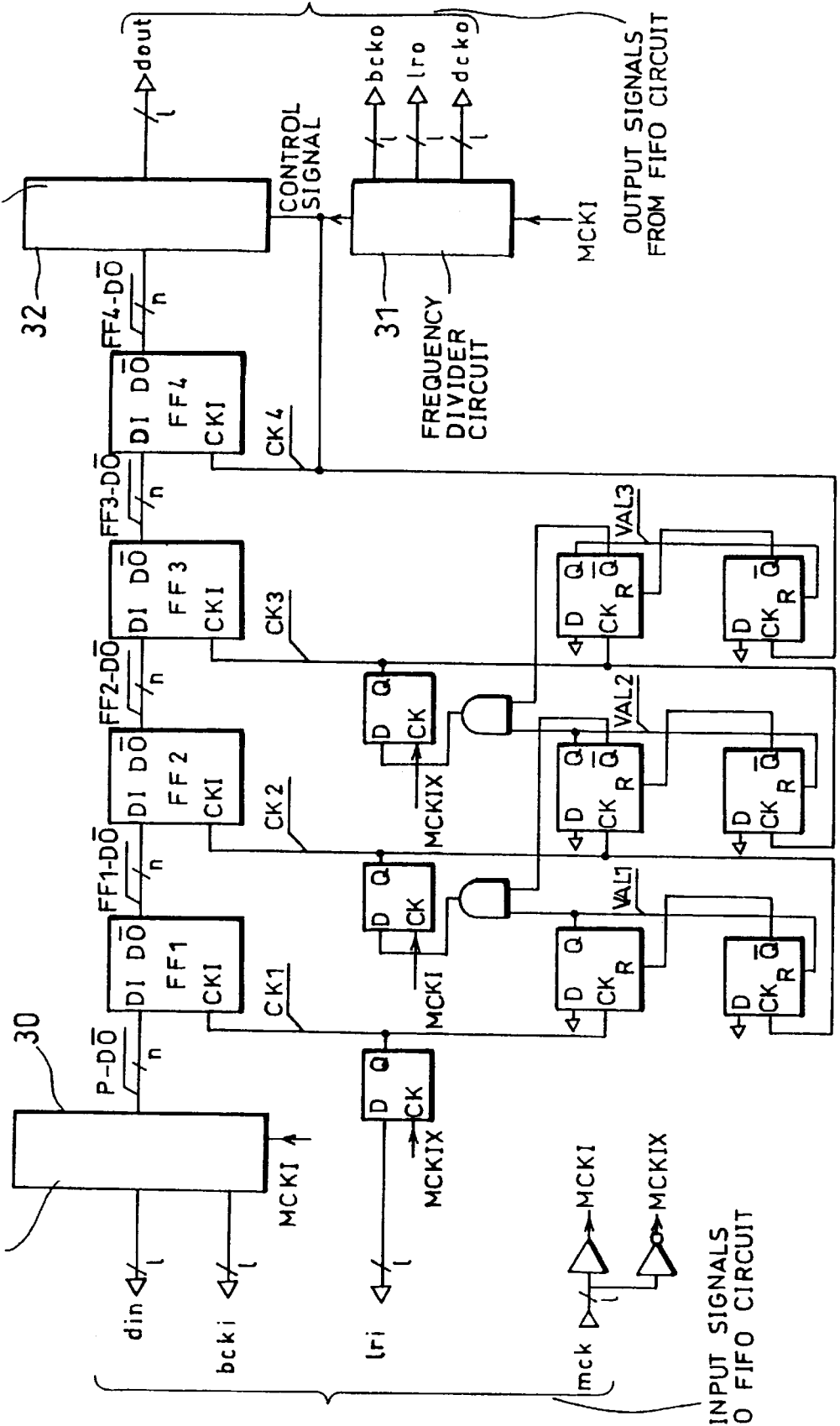
FIG. 2 is a block diagram showing the structure of essential sections of an FIFO circuit in the digital audio device.

Next, the operation of the FIFO circuit 18 of this embodiment will be explained in detail with reference to FIGS. 2 to 4. As illustrated in FIG. 2, serial data "din" input to the FIFO circuit 18 from the frequency converter circuit 17 of FIG. 1 is first converted into n-bit parallel data "P-DO" by a serial to parallel (S to P) converter circuit 30. Thereafter, the data is input to an n-bit register FF1 at the same rate as an input LR signal "lri", i.e., based on a clock signal CK1 of an average frequency of about 44.1 KHz, and latched. The signal latched in the n-bit register FF1 is promptly transferred to an n-bit register FF2 and to an n-bit register FF3 according to the values of VAL 1, VAL 2 and VAL 3 (to be described in detail later).

When converting the serial data "din" into the nbit parallel data "P-DO", a clock "bcki" extracted in the digital PLL circuit 16 is used as a shift clock. The clock signal CK1 is obtained by latching the input LR signal "lri" with MCKIX which is an inverted signal of a master clock "MCKI".

The signal transferred to the n-bit register FF3 is latched at intervals of a predetermined time by an n-bit register FF4 based on a clock CK4 of 44.1 KHz which is obtained by dividing the master clock "MCKI" as a system clock having a high frequency in a frequency divider circuit 31.

Subsequently, a parallel to serial (P to S) converter circuit 32 converts the FF4-DO as the n-bit data into serial data, and outputs output data "dout" using control signals such as a load clock output by the frequency divider circuit 31. The frequency divider circuit 31 outputs an output bit clock "bcko", an output LR signal "lro", and an output master clock "dcko" so as to output data of a uniform output rate, bit clock, LR signal and D/A converter-use master clock corresponding to the specification of the D/A converter in the next stage.

The above-mentioned signals VALL to VAL3 indicate the presence of data of the n-bit registers FF1, FF2 and FF3, respectively. More specifically, as shown in FIGS. 3 and 4, when a latch clock of a register among the n-bit registers FF1, FF2 and FF3 rises, the output of the register and the corresponding signal, i.e., VAL1, VAL2 or VAL3, become "H". Then, when a latch clock of the next n-bit register rises, the output of the n-bit register and the above-mentioned corresponding signal, VAL1, VAL2 or VAL3, become "L".

For example, the VAL 2 becomes "H" when the clock CK2 rises, and becomes "L" when the clock CK3 rises. When the clock CK2 rises, the n-bit register FF2 receives data "FF1-DO" from the n-bit register FF1, and indicates the presence of data. When the clock CK3 rises, the n-bit register FF2 outputs data "FF2-DO" to the n-bit register FF3, and indicates that data is not present.

In order to ensure timing margins for the n-bit registers FF1, FF2, FF3 and FF4, the VAL1 to VAL3 are produced using both of the leading edge and trailing edge of a master clock "MCK" having a frequency sufficiently higher than CK1 and CK4 so that CK1 and CK2, CK2 and CK3, and CK3 and CK4 do not change at the same time. Namely, the CK2 rises when the VAL1 is "H" and the VAL2 is "L", while the CK3 rises when the VAL2 is "H" and the VAL3 is "L".

The following description will explain the generation of the CK2 and CK3 in detail. As illustrated in FIG. 2, the VAL1 signal, and a signal produced by inverting the VAL2 signal are input to an AND gate. When these signals are latched by the MCKI, the CK2 is produced. Similarly, the VAL2 signal, and a signal produced by inverting the VAL3 signal are input to an AND gate. When these signals are latched by the MCKIX, the CK3 is produced.

As described above, the VAL1 to VAL3 are base signals from which the clocks CK2 and CK3 are produced. However, when the clocks CK2 and CK3 vary, the VAL1 to VAL3 also vary. For example, if the CK1 rises when the reset input of a D-flip-flop which is outputting the VAL1 signal is "H", the VAL1 becomes "H".

In contrast to the input rate of the input signals to the FIFO circuit 18, i.e., "din", "bcki" and "lri", which varies due to external interference and a change in the input rate of digital optical input supplied from the input terminal 19 shown in FIG. 1, the output rate of the output signals "dout", "bcko", "lro" and "dcko" obtained by dividing the master clock MCK is uniform. Therefore, the following state may be produced by the operation of the FIFO circuit 18 because of the difference between the input rate and the output rate.

Figure 3:
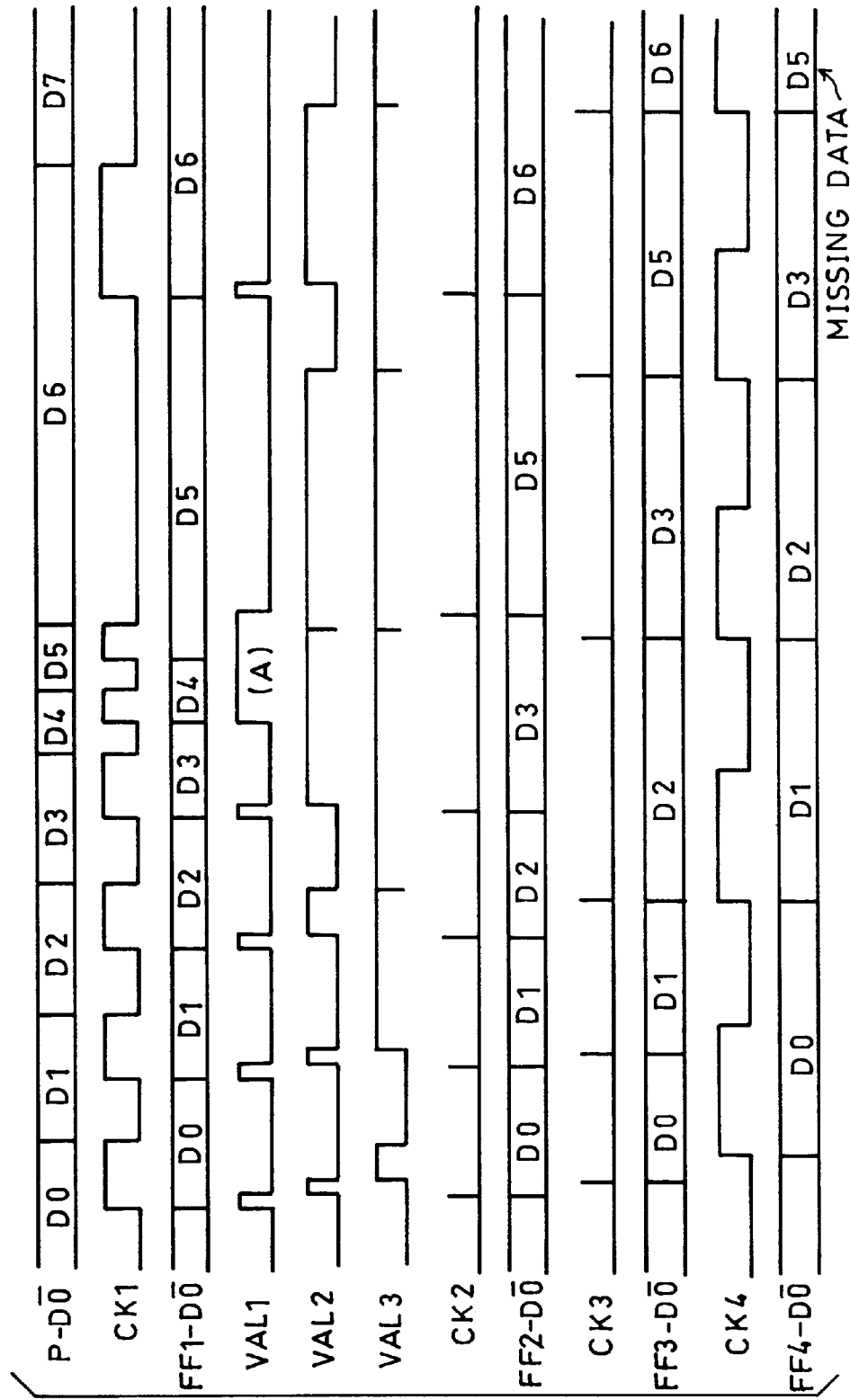
FIG. 3 is a timing chart showing an example of the operation of the FIFO circuit.
Figure 4:
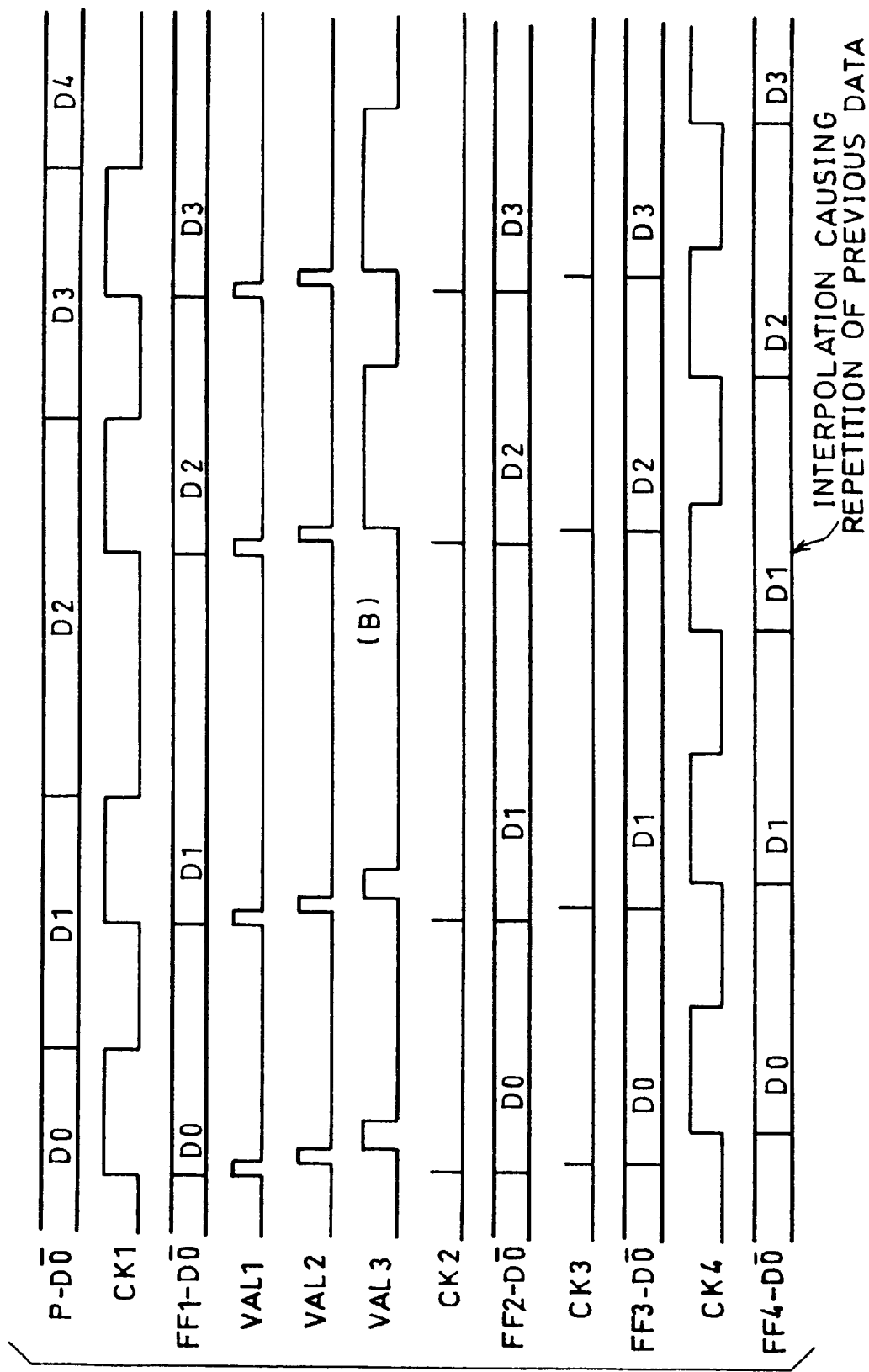
FIG. 4 is a timing chart showing another example of the operation of the FIFO circuit.

As illustrated in FIG. 3, for example, when the input rate is high, if a state (A) in which the CK1 rises at the time the VAL1 signal is "H" is produced, part of the data to be output from the FF1 is skipped, resulting in missing data. On the other hand, as shown in FIG. 4, when the input rate is low, if a state (B) in which the CK4 rises at the time the VAL3 signal is "L" is produced, part of the data to be output from the FF4 is repeated. As a result, interpolation that causes a repetition of the previous data may occur.

Consequently, if the digital optical input has a sine wave of a single frequency of, for example, 10 KHz, an undesired sound such as chatter is produced when the above-mentioned missing data or interpolation that causes a repetition of the previous data occurs. However, during the actual input of music signals, since the frequency always varies, the data is reproduced as normal sounds, causing no problem.

Sampling frequencies of 48 KHz, 44.1 KHz and 32 KHz are mentioned in this embodiment. However, these values are merely examples, and can be changed to any values. Additionally, the number of stages in the FIFO circuit 18 is not necessarily limited to four stages described in this embodiment. The number of stages in the FIFO circuit 18 is determined by the output format of the frequency converter circuit 17, and is arranged to a minimum number which does not cause missing data and interpolation that causes a repetition of the previous data when the input rate and the output rate are exactly the same.

As described above, in the digital audio device of this embodiment, after converting various types of input digital audio signals with different sampling frequencies into signals having a predetermined sampling frequency on average by the frequency converter circuit 17, the resultant signals are converted into data of a uniform output rate by the FIFO circuit 18. Further, the data is converted into analog signals by the D/A converter 21 to produce monitor outputs. In this structure, even when there is a fluctuation in the clocks extracted at the above-mentioned sampling frequencies because of external interference in input digital audio signals to be recorded and a variation in the input rate of the input signals, noise can never be generated in the D/A converter 21, thereby preventing undesired sounds from disturbing monitor outputs of music signals, etc.

Moreover, since the FIFO circuit 18 is constructed only by a gate element without using an expensive memory element such as RAM, it is possible to achieve improved monitor sounds at low cost by preventing undesired sounds from disturbing monitor outputs of music signals, etc.

Furthermore, since the same format as the output format of a digital reproduced output reproduced from the magneto-optical disk 1 is used as the output format in the FIFO circuit 18, when the output of the FIFO circuit 18 and the digital reproduced output are switched by the switching circuit 20, it is possible to convert the digital reproduced output into an analog signal by a single D/A converter. In this structure, since there is no need to add a D/A converter for monitor signals, it is possible to achieve improved monitor sounds at low cost by preventing undesired sounds from disturbing monitor outputs of music signals, etc.

As described above, the digital audio device of this embodiment is a digital audio device having the digital PLL circuit 16 for extracting clocks which are synchronous with various sampling frequencies of input digital audio signals to be recorded, and the frequency converter circuit 17 for converting the input digital audio signals into signals of a predetermined sampling frequency on average based on the clocks extracted by the digital PLL circuit 16. The digital audio device records the digital audio signals on a recording medium after performing signal processing such as signal compression on the digital audio signals which have been converted into the signals of the predetermined sampling frequency by the frequency converter circuit 17. The digital audio device includes the FIFO circuit 18 for converting outputs from the frequency converter circuit 17 into data of a uniform output rate so that correct data conversion is performed when the input rate and the output rate are the same, and the D/A converter 21 for producing monitor outputs by converting the input digital audio signals from the FIFO circuit 18 into analog signals.

In this structure, the input digital audio signals with various sampling frequencies to be recorded on a recording medium like a MD are supplied to the digital PLL circuit 16 where clocks which are synchronous with the input digital audio signals having various sampling frequencies are extracted. Next, the input digital audio signals are converted into signals with a predetermined sampling frequency on average based on the clocks extracted by the digital PLL circuit 16. The digital audio signals with the predetermined sampling frequency output from the frequency converter circuit 17 undergo ordinary signal processing such as signal compression, and are then recorded on the recording medium.

On the other hand, the digital audio signals having the predetermined sampling frequency output from the frequency converter circuit 17 are supplied to the FIFO circuit 18 for performing correct data conversion when the input rate and the output rate are the same. In the FIFO circuit 18, the digital audio signals are converted into data of a uniform output rate, and then output as monitor signals. The monitor signals are converted into analog signals by the D/A converter 21, and then output as monitor outputs of analog audio signals. This structure achieves an improvement of monitor sounds in recording digital audio signals by preventing an audible disturbance in the audio signals like in the reproduction.

Moreover, the digital audio device of this embodiment is a recording and reproducing type digital audio device having the PLL circuit 16 for extracting clocks which are synchronous with various sampling frequencies of input digital audio signals to be recorded, and the frequency converter circuit 17 for converting the input digital audio signals into signals of a predetermined sampling frequency on average based on the clocks extracted by the digital PLL circuit 16. The digital audio device records the digital audio signals on a recording medium after performing signal processing such as signal compression on the digital audio signals of the predetermined sampling frequency produced by the frequency converter circuit 17. The digital audio device produces reproduced signals by reading information recorded on the recording medium and by performing signal processing such as signal decompression on the information, and includes: the FIFO circuit 18 for converting outputs from the frequency converter circuit 17 into data of a uniform output rate so that correct data conversion is performed when the input rate and the output rate are the same, the output format of monitor signals produced by the FIFO circuit 18 being the same as the output format of the reproduced signals from the recording medium when reproduction is performed by the digital audio device; the switching circuit 20 for performing switching between the monitor signals and the reproduced signals; and the D/A converter 21 for converting the monitor signals or the reproduced signals output as digital audio signals from the switching circuit 20 into analog signals.

In this structure, the input digital audio signals with various sampling frequencies to be recorded on a recording medium like a disk are supplied to the digital PLL circuit 16 where clocks which are synchronous with the input digital audio signals having various sampling frequencies are extracted. Next, the input digital audio signals are converted into signals with a predetermined sampling frequency on average based on the clocks extracted by the digital PLL circuit 16. The digital audio signals with the predetermined sampling frequency output from the frequency converter circuit 17 undergo ordinary signal processing such as signal compression, and are then recorded on the recording medium.

On the other hand, the digital audio signals having the predetermined sampling frequency output from the frequency converter circuit 17 are supplied to the FIFO circuit 18 for performing correct data conversion when the input rate and the output rate are the same. The digital audio signals are converted into data of a uniform output rate by the FIFO circuit 18, and then output as monitor signals. The output format of the monitor signals is arranged to be the same as the output format of a reproduced signal on which signal processing such as signal decompression has been performed during reproduction in the digital audio device. The monitor signal and reproduced signal of the same format are guided to the switching device 20. One of the outputs is selectively output from the switching device 20. The monitor signal or the reproduced signal which is selectively output from the switching device 20 is converted into an analog signal by the D/A converter 21, and an analog monitor output or an analog reproduced output is selectively output.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A digital audio device capable of converting having respective different sampling frequencies into analog signals and outputting the analog signals, comprising:

clock extracting means for extracting clocks synchronized with the respective different sampling frequencies of the input digital audio signals;

frequency converting means for converting the input digital audio signals into digital signals of a predetermined sampling frequency on average based on the respective clocks extracted by said clock extracting means;

output rate converting means for converting the digital signals output from said frequency converting means into digital signals of a uniform output rate; and D/A converting means for converting the digital signals output from said output rate converting means into analog signals.

2. The digital audio device as set forth in claim 1,
   wherein said clock extracting means is formed by a phase-locked loop.

3. The digital audio device as set forth in claim 1,
   wherein said output rate converting means is formed by a multi-stage FIFO circuit.

4. The digital audio device as set forth in claim 3,
   wherein the number of stages in said FIFO circuit is arranged to be a minimum number which does not produce missing data or interpolation that causes a repetition of previous data due to a fluctuation in the respective clocks extracted from the input digital audio signals when an input rate of the input digital audio signals and the output rate of the digital signals output from said FIFO circuit are the same.

5. The digital audio device as set forth in claim 3,
   wherein said FIFO circuit is formed by a gate element.

6. The digital audio device according to claim 1, further comprising recording and reproducing means for recording the input digital audio signals on a recording medium and reproducing the digital audio signals recorded on said recording medium, wherein, when recording the input digital audio signals on said recording medium by said recording and reproducing means, said output rate converting means outputs monitor signals for monitoring the input digital audio signals to said D/A converting means, and said D/A converting means converts the monitor signals into analog signals and outputs the analog signals.

7. The digital audio device according to claim 6,
   wherein said output rate converting means outputs a monitor signal of an output format which is the same as an output format of a reproduced signal reproduced from said recording medium by said recording and reproducing means, said digital audio device further comprises switching means, to which the reproduced signal reproduced by said recording and reproducing means and the monitor signal output from said output rate converting means are input, for selectively outputting the reproduced signal or the monitor signal, and said D/A converter means converts the signal output from said switching means into an analog signal and outputs the analog signal.

* * * * *